(12) United States Patent
Kawahara

(10) Patent No.: US 11,095,871 B2
(45) Date of Patent: Aug. 17, 2021

(54) SYSTEM THAT GENERATES VIRTUAL VIEWPOINT IMAGE, METHOD AND STORAGE MEDIUM

(71) Applicant: CANON KABUSHIKI KAISHA, Tokyo (JP)

(72) Inventor: Takuto Kawahara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 119 days.

(21) Appl. No.: 16/390,168

(22) Filed: Apr. 22, 2019

(65) Prior Publication Data

US 2019/0335162 A1    Oct. 31, 2019

(30) Foreign Application Priority Data

Apr. 26, 2018  (JP) .............................. JP2018-084947

(51) Int. Cl.
*H04N 13/282* (2018.01)
*G06T 7/593* (2017.01)
*H04N 13/279* (2018.01)
*H04N 13/243* (2018.01)

(52) U.S. Cl.
CPC .......... *H04N 13/282* (2018.05); *G06T 7/593* (2017.01); *H04N 13/243* (2018.05); *H04N 13/279* (2018.05)

(58) Field of Classification Search
None
See application file for complete search history.

(56) References Cited

U.S. PATENT DOCUMENTS

| 10,755,471 | B2* | 8/2020 | Umemura | H04N 5/232 |
| 2014/0111507 | A1* | 4/2014 | Kim | G06T 15/08 |
| | | | | 345/419 |
| 2015/0228093 | A1* | 8/2015 | Miyasa | G06T 11/60 |
| | | | | 382/131 |

FOREIGN PATENT DOCUMENTS

| JP | 2004201085 A | * | 7/2004 |
| JP | 2005201292 A | * | 7/2005 |
| JP | 2007017364 A | * | 1/2007 |
| JP | 2009074836 A | | 4/2009 |
| JP | 2009265915 A | * | 11/2009 |

* cited by examiner

*Primary Examiner* — Jiangeng Sun
(74) *Attorney, Agent, or Firm* — Rossi, Kimms & McDowell LLP

(57) ABSTRACT

A system that generates a virtual viewpoint image from multiple viewpoint images captured from different camera viewpoints uses background 3D data representing a three-dimensional shape of a background in an image capturing scene. This background 3D data is generated by using a simulation image representing a view from the camera viewpoint. Then, a difference between the simulation image and an image acquired by performing test image capturing from the same camera viewpoint as the camera viewpoint is detected and the background 3D data is updated based on detection results.

21 Claims, 13 Drawing Sheets

| Name | Classification | Size (X × Y × Z m) |
|---|---|---|
| stadium | facility | 244 × 244 × 62.0 |
| ... | ... | ... |
| soccer goal (general) | structure | 7.32 × 1.20 × 2.44 |
| corner flag | structure | 0.05 × 0.05 × 1.20 |
| bench(soccer) | structure | 15.0 × 5.00 × 2.50 |
| microphone | structure | 0.60 × 0.30 × 0.50 |
| broadcasting camera | structure | 0.50 × 1.20 × 1.50 |
| ... | ... | ... |

501

Name            soccer goal (general)
Classification  soccer
Size            7.32 × 1.20 × 2.44
Data format     obj
Data size       ...
...

503

SYSTEM THAT GENERATES VIRTUAL VIEWPOINT IMAGE, METHOD AND STORAGE MEDIUM

BACKGROUND OF THE INVENTION

Field of the Invention

The present invention relates to a technique to generate an image from a virtual viewpoint based on images captured from a plurality of viewpoints.

Description of the Related Art

In recent years, a virtual viewpoint image technique has been attracting attention, which reproduces an image from a camera (virtual camera) not existing actually, which is arranged virtually within a three-dimensional space, by using images captured by a plurality of real cameras. According to the virtual viewpoint image technique, for example, it is made possible to view a highlight scene in a sports game from a variety of angles, and therefore, it is possible to give a high feeling of being at a live performance. For generation of a virtual viewpoint image, concentration of image data captured by a plurality of real cameras to a server or the like, generation of a three-dimensional model (shape data of object) in the server or the like, image processing, such as rendering, and so on may become necessary. Regarding this point, in Japanese Patent Laid-Open No. 2009-74836, a technique has been disclosed, which is capable of faithfully reproducing a three-dimensional model of a target object by using a moving image captured in a real environment.

In a case where an attempt is made to obtain a high-quality virtual viewpoint image, the processing load for generation thereof increases. An object of the present invention is to attain both a reduction in the processing load relating to generation of a virtual viewpoint image and a high image quality of a virtual viewpoint image.

SUMMARY OF THE INVENTION

The system according to the present disclosure is a system that generates an image corresponding to a specified viewpoint and the system includes: a generation unit configured to generate a simulation image corresponding to a viewpoint from at least one image capturing apparatus of a plurality of image capturing apparatuses based on three-dimensional shape data of a background in an image capturing scene; a detection unit configured to detect a difference between the simulation image generated by the generation unit and a captured image acquired by using the at least one image capturing apparatus; and an updating unit configured to update the three-dimensional shape data of the background based on detection results by the detection unit.

Further features of the present disclosure will become apparent from the following description of exemplary embodiments with reference to the attached drawings.

BRIEF DESCRIPTION OF THE DRAWINGS

FIG. 5 is a diagram showing an example of a 3D data library;

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

Before the present embodiment is explained, problems (to be solved) that may occur actually on site at which generation of a virtual viewpoint image is performed are reviewed. In a case where an attempt is made to obtain a high-quality virtual viewpoint image, it is also necessary to process a background as a three-dimensional object. Regarding this point, in a case where a game of, for example, a professional sport, is taken to be a target, it is necessary to process a vast amount of data in order to faithfully reproduce a background of a large-scale facility three-dimensionally, such as a stadium, by processing a moving image captured from a large number of viewpoints. Consequently, it is considered to install in advance image capturing cameras, a server, and the like in a stadium or the like, which is an event venue, and to generate in advance 3D data of the background before image capturing (hereinafter, called "actual image capturing"). However, it is difficult to construct the same environment as that at the time of actual image capturing. For example, in a game of soccer, on the ground before actual image capturing, on one hand, there are workers who make preparations for the game, event officials, and the like and on the other hand, there are facilities that are not installed until immediately before the start of the game, such as sound collecting microphones and corner flags. Because of this, a case may occur where an unnecessary object is included in the 3D data (3D data without texture) of a stadium or the like, which is obtained based on images captured in advance, or on the contrary, a necessary object does not exist. In order to deal with such a problem, in the present embodiment, a method is explained, by which it is possible to obtain high-accuracy background 3D data with a light load in a short time in a case where generation of a virtual viewpoint image is performed by taking a sports event (specifically, soccer) in the stadium as a target.

System Configuration

Figure 1:
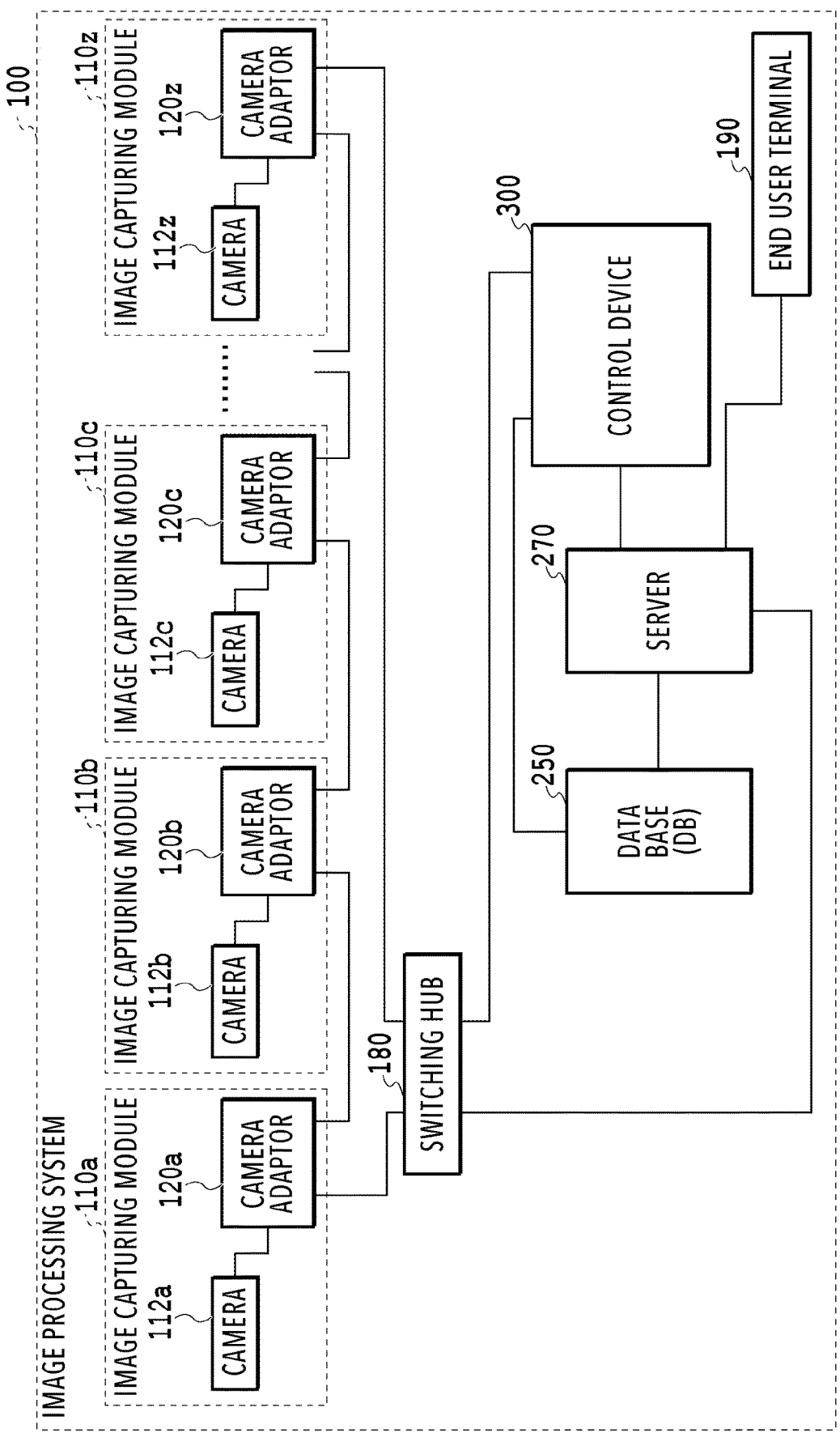
FIG. 1 is a diagram showing an example of a configuration of a virtual viewpoint image generation system.

A system that performs image capturing by installing a plurality of cameras in a large-scale facility, such as a stadium and a concert hall, is explained by using s system configuration diagram in FIG. 1. An image processing system 100 has image capturing modules 110a to 110z, a database (DB) 250, a server 270, a control device 300, a switching hub 180, and an end user terminal 190. That is, the image processing system 100 has three function domains, that is, a video image collection domain, a data saving domain, and a video image generation domain. The video image collection domain includes the image capturing modules 110a to 110z, the data saving domain includes the DB 250 and the server 270, and the video image generation domain includes the control device 300 and the end user terminal 190.

The control device 300 manages the operation state, performs parameter setting control, and so on for each block configuring the image processing system 100 through a network. Here, the network may be GbE (Gigabit Ethernet) or 10 GbE in conformity with the IEEE standard, which is Ethernet (registered trademark), or may be configured by combining interconnect Infiniband, an industrial local area network, and the like. Further, the network is not limited to those and a network of another type may be used.

First, an operation to transmit 26 sets of images of the image capturing modules 110a to 110z from the image capturing module 110z to the server 270 is explained. Each of the image capturing modules 110a to 110z has each of cameras 112a to 112z, respectively. In the following, there is a case where the systems of the 26 sets of the image capturing modules 110a to 110z are simply described as "image capturing module 110" without distinguishing them from one another. Similarly, there is also a case where the device within each image capturing module 110 is described as "camera 112" and "camera adaptor 120" similarly. Here, the number of image capturing modules 110 is set to 26, but this is merely exemplary and the number is not limited to this. Further, in the present embodiment, explanation is given on the supposition that the wording "image" includes the concept of moving image and still image. That is, it is possible for the image processing system 100 to process both a still image and a moving image. Further, in the present embodiment, explanation is given by taking a virtual viewpoint image as an example as virtual viewpoint contents provided by the image processing system 100, but voices may be included in the virtual viewpoint contents.

The image capturing modules 110a to 110z are connected by a daisy chain. By this connection aspect, there is an effect of a reduction in the number of connection cables and saving of wiring work in a case where the capacity of image data becomes large accompanying an increase in resolution of a captured image to 4K and 8K and an increase in the frame rate. The connection aspect is arbitrary and for example, it may also be possible to adopt a star network configuration in which each of the image capturing modules 110a to 110z is connected to the switching hub 180 and transmission and reception of data between the image capturing modules 110 are performed via the switching hub 180.

In the present embodiment, each image capturing module 110 is configured by the camera 112 and the camera adaptor 120, but the image capturing module 110 is not limited to this configuration. For example, the image capturing module 110 may have a microphone, a pan head, and an external sensor. Further, in the present embodiment, the configuration is such that the camera 112 and the camera adaptor 120 are separated from each other, but both may be integrated into one unit in the same casing. The image captured by the camera 112a within the image capturing module 110a is transmitted to the cameral adaptor 120b of the image capturing module 110b after being subjected to image processing, to be described later, in the camera adaptor 120a. Similarly, the image capturing module 110b transmits the image captured by the camera 112b to the image capturing module 110c along with the image acquired from the image capturing module 110a. By continuing the operation such as this, the captured images acquired by the image capturing modules 110a to 110z are transmitted from the image capturing module 110z to the switching hub 180 and then transmitted to the server 270.

Configuration of Camera Adaptor

Figure 2A:
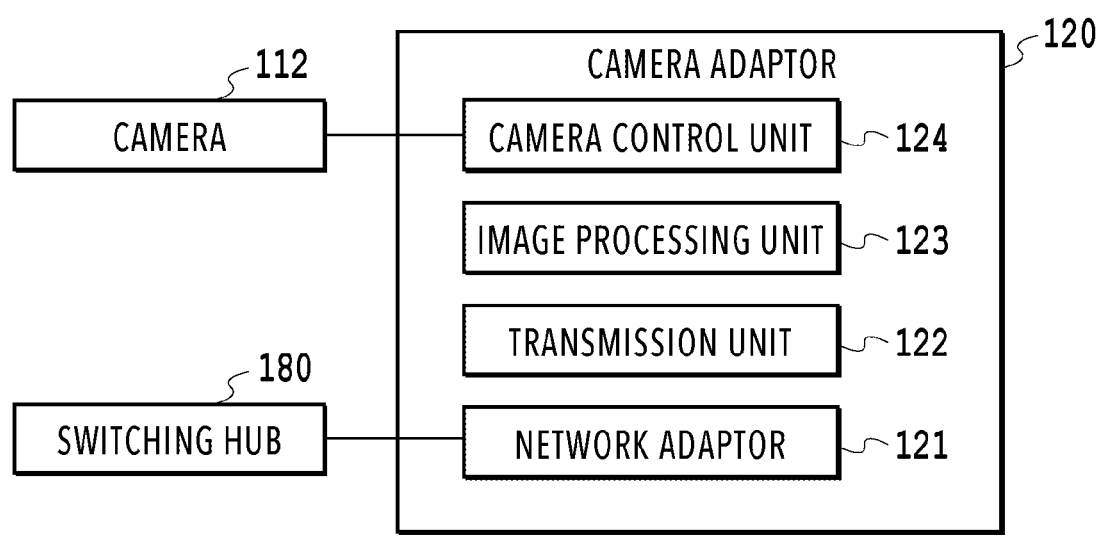
FIG. 2A is a function block diagram showing an internal configuration of a camera adaptor and FIG. 2B is a function block diagram showing details of an image processing unit within the camera adaptor.

Next, details of the camera adaptor 120 are explained. FIG. 2A is a function block diagram showing an internal configuration of the camera adaptor 120. The camera adaptor 120 includes a network adaptor 121, a transmission unit 122, an image processing unit 123, and a camera control unit 124.

The network adaptor 121 performs data communication with another camera adaptor 120, the server 270, and the control device 300. Further, the network adaptor 121 is in conformity with, for example, the IEEE 1588 standard Ordinary Clock and also performs saving of the time stamp of the data transmitted to and received from the server 270, time synchronization with the server 270. It may also be possible to implement the time synchronization with the time server by another EtherAVB standard or an original protocol. In the present embodiment, NIC (Network Interface Card) is made use of as the network adaptor 121, but the network adaptor 121 is not limited to this.

The transmission unit 122 controls transmission of data to the switching hub 180 and the like via the network adaptor 121 The transmission unit 122 has a function to perform compression to which a predetermined compression scheme, a compression rate, and a frame rate are applied for the data that is transmitted or received, and a function to decompress compressed data. Further, the transmission unit 122 has a function to determine a routing destination of received data and data processed by the image processing unit 123, and a function to transmit data to the determined routing destination. Furthermore, the transmission unit 122 also has a function to create a message for transferring image data to another camera adaptor 120 or the server 270. In a message, meta information on image data is included. In the meta information, the time code or the sequence number at the time of sampling of image capturing, the data type, the identifier of the camera 112, and the like are included. The image data to be transmitted may be compressed. Further, the transmission unit 122 receives a message from another camera adaptor 120 and restores data information fragmented into the transmission protocol standard packet size into image data in accordance with the data type included in the message.

The image processing unit 123 performs processing, such as foreground/background separation processing, foreground three-dimensional model source information generation processing, and dynamic calibration, for the image data captured by the camera 112 by the control of the camera control unit 124 and the image data received from another camera adaptor 120. The foreground/background separation processing is processing to separate the image captured by the camera 112 into a foreground image corresponding to specific objects and a background image corresponding to those other than the specific objects. The specific objects in this case correspond to, in a case where the image capturing scene is, for example, a soccer game, an object whose shape is determined, such as a ball, in addition to a person, such as a player, a manager, and a referee. Further, in many cases, the foreground in the game of a sport, such as soccer, is a moving object, and therefore, it may also be possible for a moving body to be detected as a specific object. By separately processing the foreground image including an important object, such as a person, and the background image not including such an object, it is possible to improve the image quality of the portion corresponding to the specific object in the virtual viewpoint image to be generated. Further, each of the plurality of the camera adaptors 120 performing the foreground/background separation processing, it is possible to distribute the load in the image processing system 100. The foreground three-dimensional model source information generation processing is processing to generate image information, which is a source of a foreground three-dimensional model, by making use of the foreground image separated from the captured image by the foreground/background separation processing described above, and the foreground image whose viewpoint is different received from another camera adaptor 120 located upstream. The dynamic calibration is calibration performed during image capturing and includes color correction processing for suppressing a variation in color for each camera, camera shake correction processing (electronic anti-vibration processing) for stabilizing the position of the image for the camera shake resulting from the vibration of the camera, and the like. Details of the configuration for implementing the image processing will be described later.

The camera control unit 124 connects with the camera 112 and performs control of the camera 112, captured image acquisition, synchronization signal provision, time setting, and the like. The control of the camera 112 includes, for example, setting of and reference to image capturing parameters (setting of number of pixels, color depth, frame rate, white balance, and the like), acquisition of state information on the camera 112 (during image capturing, stopped, during synchronization, error, and the like), start and stop of image capturing, focus adjustment, and the like.

Details of Image Processing Unit

Figure 2B:
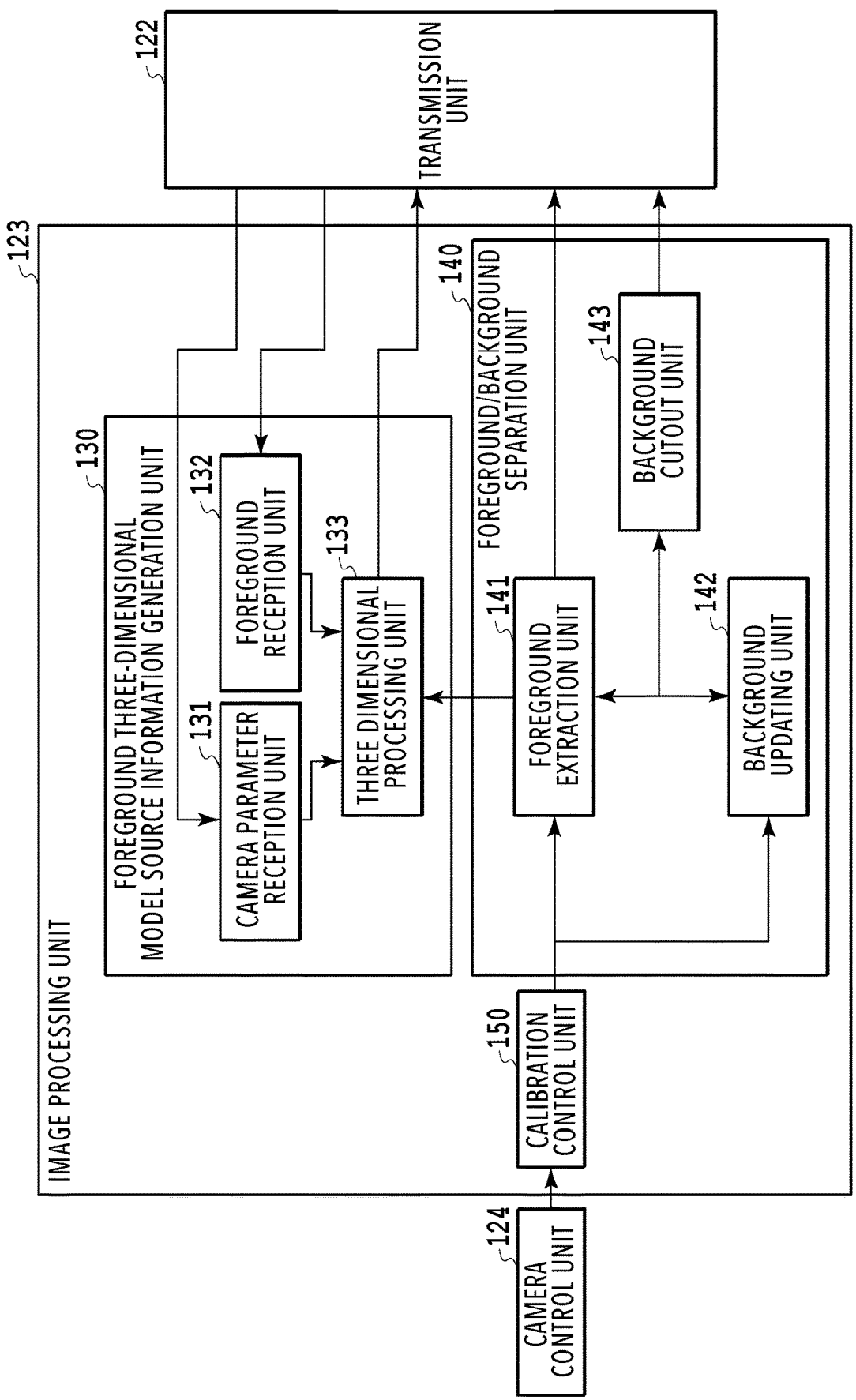

FIG. 2B is a function block diagram showing details of the image processing unit 123 inside the camera adaptor 120. The image processing unit 123 includes a foreground three-dimensional model source information generation unit 130, a foreground/background separation unit 140, and a calibration control unit 150.

The foreground/background separation unit 140 includes a foreground extraction unit 141, a background updating unit 142, and a background cutout unit 143. The foreground extraction unit 141 performs processing to extract a foreground image by performing comparison processing with the background image for the image for which positioning has been performed regarding the captured image of the camera 112. The background updating unit 142 performs updating processing of the background image. This updating processing is based on transmitting the background image whose change is less to the server 270 by thinning frames, while transmitting every frame of the foreground image to the server 270. For example, in a case of the setting that the background image is transmitted every minute, the background image is updated every minute. The background cutout unit 143 performs processing to cut out a part of the background image. This cutout is not indispensable and in a case where there is a margin in the network transmission, it may also be possible not to perform the cutout.

The foreground three-dimensional model source information generation unit 130 includes a camera parameter reception unit 131, a foreground reception unit 132, and a three-dimensional processing unit 133. The camera parameter reception unit 131 receives internal parameters unique to the camera 112 (focal length, image center, lens distortion parameters, and the like) and external parameters representing the position/orientation of the camera 112 (rotation matrix, position vector, and the like) from the control device 300. The received camera parameters are delivered to the three-dimensional processing unit 133. The foreground reception unit 132 receives a foreground image extracted from a captured image acquired by using the camera 112 other than itself located upstream thereof The data of the received foreground image of the camera 112 other than itself delivered to the three-dimensional processing unit 133. The three-dimensional processing unit 133 generates image information that is a source of a foreground three-dimensional model (foreground three-dimensional model source information) by a method, such as a stereo camera. The images that are used at this time are the foreground image extracted by the foreground extraction unit 141 described above and the foreground images extracted by one or more cameras 112 other than itself located upstream thereof.

The calibration control unit 150 performs processing relating to calibration, such as performing the dynamic calibration described above in accordance with parameters set in advance for the image data input from the camera control unit 124.

Configuration of Server

First, an outline of the functions possessed by the server 270 is explained. The server 270 of the present embodiment performs a variety of pieces of processing for various kinds of data, such as the foreground image and the background image acquired from the image capturing module 110z, the foreground three-dimensional model source information, and the like. Further, the server 270 has a function to distribute a time and a synchronization signal and distributes a time and a synchronization signal to the image capturing modules 110a to 110z via the switching hub 180. The camera adaptors 120a to 120z having received a time and a synchronization signal perform frame synchronization by causing the cameras 112a to 112z to perform generator locking based on the time and synchronization signal. In this manner, the server 270 synchronizes the image capturing timing of a plurality of the cameras 112. Due to this, it is possible for the image processing system 100 to generate a virtual viewpoint image based on the captured images from a plurality of viewpoints captured at the same timing, and therefore, it is possible to suppress a reduction in quality of a virtual viewpoint image due to a deviation in the image capturing timing.

Further, the server 270 writes to the DB 250 in accordance with the identifier of the camera, the data type, and the frame number after reconfiguring transmitted segmented packets from the image data acquired from the image capturing module 110z and converting the data format. Then, the server 270 receives information (virtual camera parameters)

relating to the position/orientation of the virtual camera based on the user specification or automatically from the control device 300. Then, the server 270 generates a virtual viewpoint image by performing rendering processing in accordance with the received virtual camera parameters. The configuration of the server 270 is not limited to the example described above. For example, a configuration may be accepted in which the function to acquire multiple viewpoint image data from the image capturing module 110z and write to the DB 250 and the function to read the multiple viewpoint image data from the DB 250 and generate a virtual viewpoint image are performed by different servers. The rendering image (virtual viewpoint image) representing a view from the virtual viewpoint obtained by the rendering processing is transmitted from the server 270 to the end user terminal 190. Then, it is possible for a user who operates the end user terminal 190 to browse the image in accordance with the virtual viewpoint specified by the user. It is also possible to say that the virtual viewpoint contents in the present embodiment are the image obtained in a case where the object is captured from a virtual viewpoint, that is, the image representing a view from an arbitrary viewpoint specified by a user. It may also be possible for a user to directly specify a virtual viewpoint or to design a configuration in which a viewpoint is specified automatically based on results of an image analysis.

Figure 3:
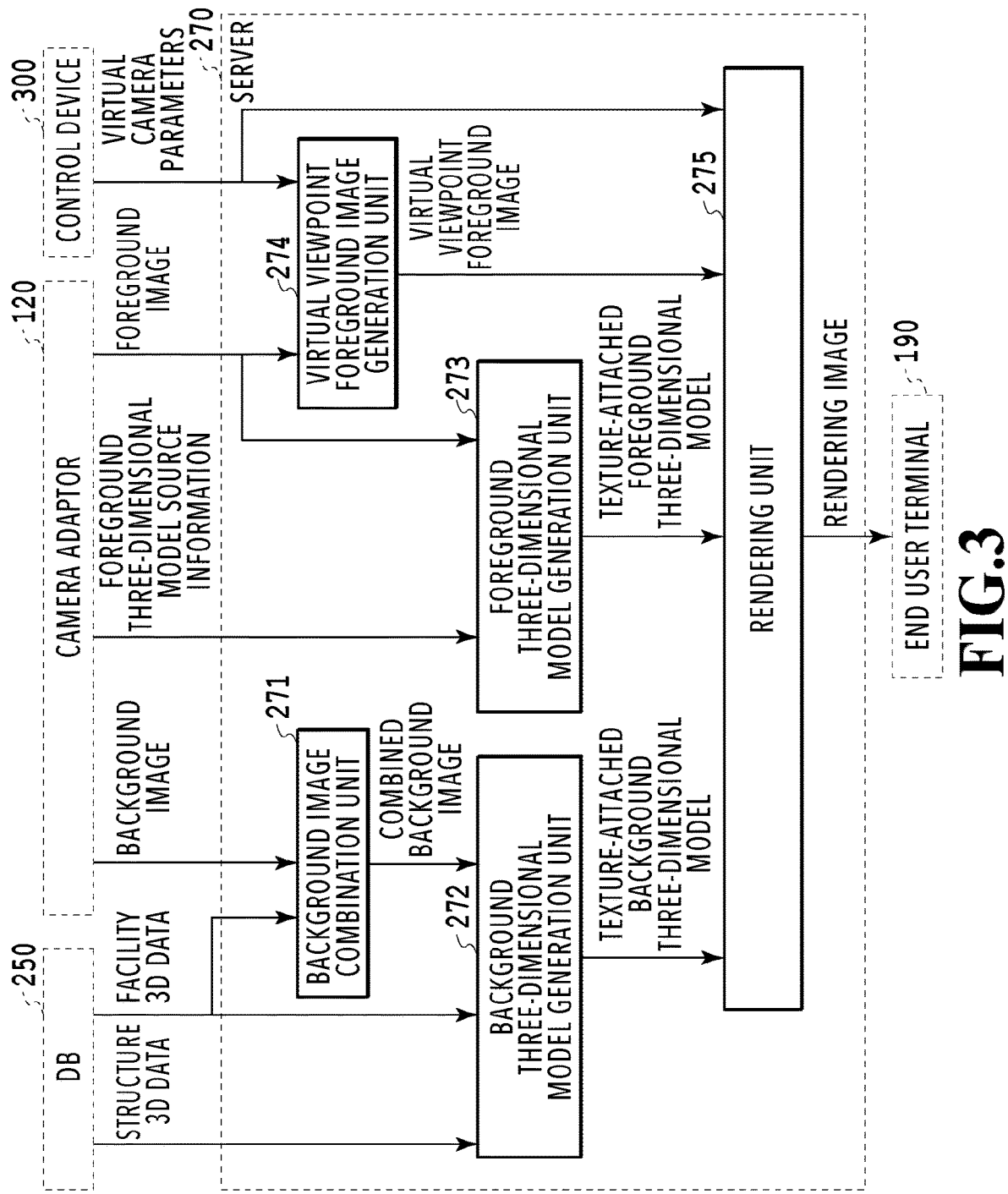
FIG. 3 is a block diagram showing main functions relating to generation of a virtual viewpoint image in a server.

FIG. 3 is a block diagram showing main functions relating to generation of a virtual viewpoint image of the server 270. A background image combination unit 271 combines background images acquired form each camera adaptor 120 based on data representing the three-dimensional shape of a facility (facility 3D data), such as a stadium and a concert hall acquired from the DB 250. In detail, the background image combination unit 271 specifies the position coordinates of each background image for the position coordinates of the facility 3D data and generates one background image (combined background image) by combining all the background images. The facility 3D data is data, for example, in the CAD format or in the mesh format, representing the three-dimensional shape of a stadium or the like. The generated combined background image is sent to a background three-dimensional model generation unit 272.

The background three-dimensional model generation unit 272 acquires the facility 3D data described above and structure 3D data from the DB 250 and generates a texture-attached background three-dimensional model. The structure 3D data refers to 3D data representing a three-dimensional shape of a still object, such as, in a case where the image capturing scene is, for example, a soccer game, a soccer goal and a corner flag, installed within the facility. The background three-dimensional model generation unit 272 performs processing to paste a texture to the facility 3D data and the structure 3D data by using the combined background image obtained by the background image combination unit 271. The texture refers to an image representing the feel of a material of the surface of an object. Due to this, a texture-attached background three-dimensional model closer to the three-dimensional space in the actual image capturing scene is generated. The generated texture-attached background three-dimensional model is sent to a rendering unit 275.

A foreground three-dimensional model generation unit 273 generates a texture-attached foreground three-dimensional model based on the foreground three-dimensional model source information and the foreground image acquired from the camera adaptor 120. In detail, first, the foreground three-dimensional model generation unit 273 generates a foreground three-dimensional model representing a general (omnidirectional) three-dimensional shape of a specific object by VisualHull (volume intersection method) by using the foreground three-dimensional model source information of the same time generated by each camera adaptor 120. Then, the foreground three-dimensional model generation unit 273 generates a texture-attached foreground three-dimensional model for each specific object by performing color matching of the texture boundary or the like based on the foreground image extracted by each camera adaptor 120 for the obtained foreground three-dimensional model. The generated texture-attached foreground three-dimensional model is sent to the rendering unit 275.

A virtual viewpoint foreground image generation unit 274 converts each foreground image acquired from the camera adaptor 120 into a foreground image in a case of being viewed from the virtual viewpoint based on the virtual camera parameters acquired from the control device 300. The foreground image obtained by the conversion (virtual viewpoint foreground image) is sent to the rendering unit 275.

The rendering unit 275 generates a virtual viewpoint image of the whole view by performing rendering processing based on the virtual camera parameters in a predetermined rendering mode (generation method used for generation of virtual viewpoint image). As the rendering mode, in the present embodiment, model-based rendering (MBR) is supposed. The MBR is a method of generating a virtual viewpoint image by using a three-dimensional model generated based on images obtained by capturing an object from a plurality of directions. Specifically, by making use of a three-dimensional model of a target image capturing scene obtained by a three-dimensional shape restoration method, such as the volume intersection method and multi-view-stereo (MVS), an image representing a view of the image capturing scene from a virtual viewpoint is generated. The rendering mode is not limited to the MBR and for example, it may also be possible to use another rendering method, such as image-based rendering (IBR). The data of the rendering image representing a view from a virtual viewpoint, which is generated as described above, is output by using Ethernet (registered trademark), SDI, DisplayPort, HDMI (registered trademark), and the like in response to a request from the end user terminal 190.

Configuration of Database

Figure 4:
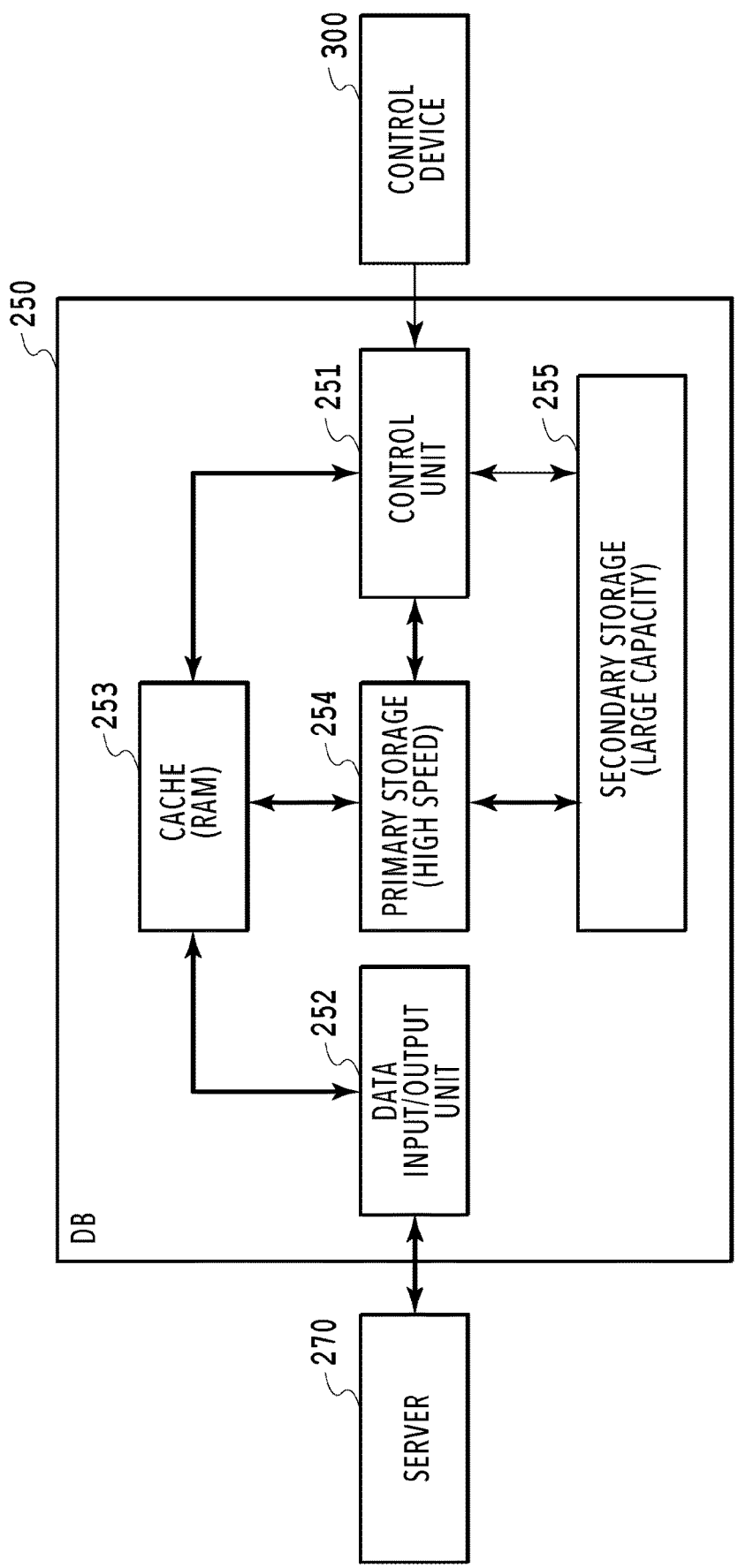
FIG. 4 is a function block diagram showing an internal configuration of a database.

Next, details of the DB 250 are explained. FIG. 4 is a function block diagram showing an internal configuration of the DB 250. The DB 250 includes a control unit 251, a data input/output unit 252, a cache 253, a primary storage 254, and a secondary storage 255. The control unit 251 includes a CPU, a DRAM, a NAND memory storing program data and various kinds of data, and the like, and controls the entire DB 250. The data input/output unit 252 performs transmission and reception of image data and the like with the server 270 by high-speed communication, such as InfiniBand. The cache 253 stores image data and the like acquired from the data input/output unit 252 and holds a predetermined amount of data corresponding to a captured image corresponding to at least one frame by a DRAM or the like capable of implementing high-speed input/output throughput. In a case where data exceeding a predetermined amount is input, data is written to the primary storage 254 in order from old data as required. The data already written is overwritten by new data. Due to this, in a case where rendering processing is performed in the server 270, it is made possible to suppress throughput within the DB 250 to a minimum and to perform rendering of the most recent frame with a low delay and successively. In a case where data of a frame having no background image is cached, the background image on the cache is not updated and held on the cache as it is. The capacity of the DRAM capable of caching is determined by a cache frame size set in advance in the system or instructions from the control device 300. Data other than the captured image has a low frequency of input/output and high-speed throughput is not required, and therefore, is copied to the primary storage 254 immediately. The cached data is read by the data input/output unit 252.

The primary storage 254 is configured by connecting an SSD or the like in parallel and capable of implementing data write to and data read from the data input/output unit 252 at the same time at a high speed. Then, to the primary storage 254, data is written in order from old data stored on the cache 253. The secondary storage 255 includes an HDD and the like and for the secondary storage 255, a large capacity is regarded as being more important than a high speed and the secondary storage 255 is requested to be a medium less inexpensive compared to the primary storage 254 and suitable for long-term saving. In the secondary storage 255, the facility 3D data and the structure 3D data described previously are held and the secondary storage 255 functions as a background 3D data library. The 3D data of the facility and the structure held in the background 3D data library is prepared in advance in accordance with the image capturing scene (kind of sport and event). FIG. 5 shows an example of the background 3D data library. Symbol 501 is a list of facility 3D data and structure 3D data that are held. Then, each piece of 3D data is held in association with 2D data as indicated by symbol 502. As the 2D data, not only data viewed from one direction but also data viewed from a plurality of angles is also prepared. Further, detailed information as indicated by symbol 503 is also held together. The facility 3D data and the structure 3D data within the secondary storage 255 are transmitted from the data input/output unit 252 to the server 270 in response to a request of the control device 300. Further, the background 3D data is classified into two kinds of data, that is, facility data and structure data, but the classification is not limited to this and for example, it may also be possible to classify 3D data of a person who cannot be a foreground (ball boy and the like) into another kind of data.

Configuration of Control Device

Figure 6:
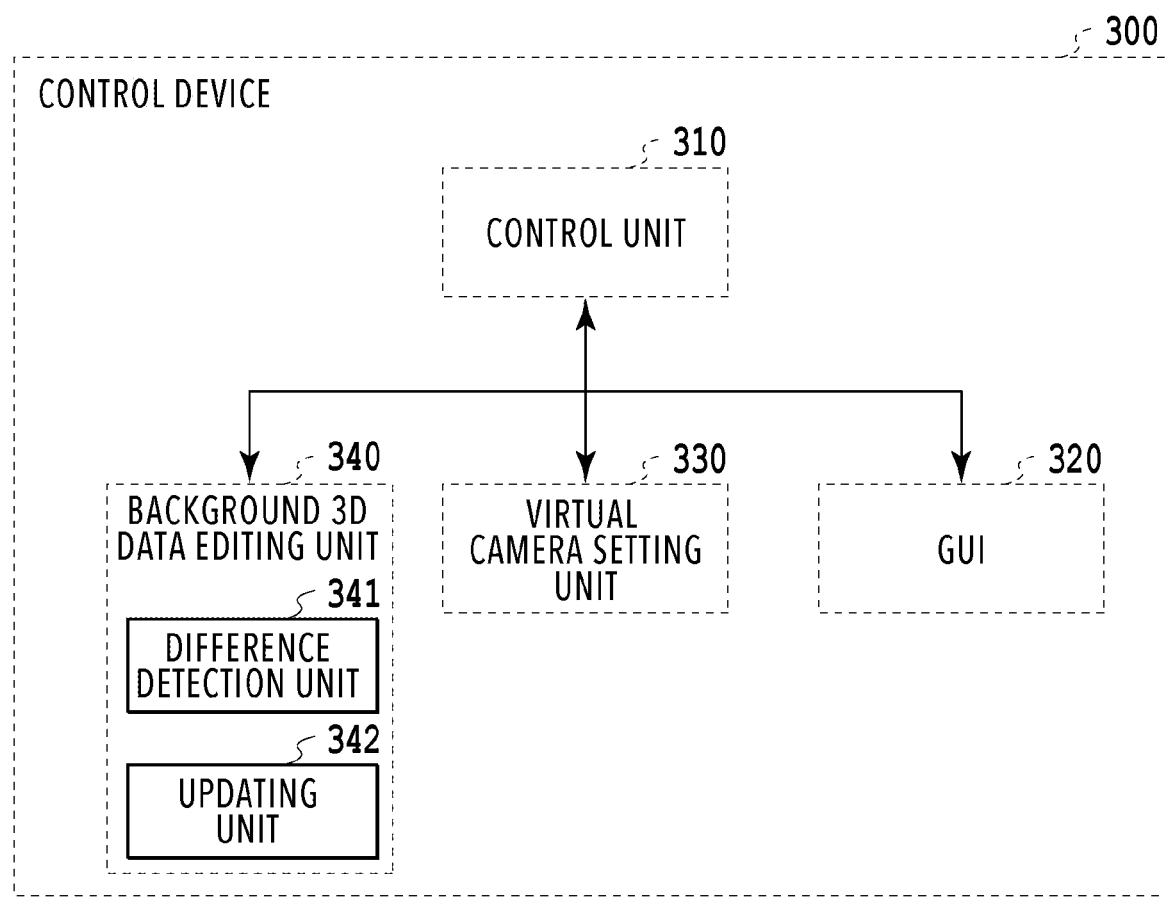
FIG. 6 is a function block diagram showing an internal configuration of a control device.

Next, details of the control device 300 are explained. FIG. 6 is a function block diagram showing the internal configuration of the control device 300. The control device 300 includes a control unit 310, a GUI 320, a virtual camera setting unit 330, and a background three-dimensional data editing unit 340. The control unit 310 includes a CPU, a RAM, a ROM, and the like and controls each unit within the control device 300. The GUI (Graphical User Interface) 320 includes, for example, a touch panel LCD and receives various operations and instructions from a user, displays necessary information, and so on. It is possible for a user to start and stop image capturing, change the parameters of the camera 112, specify a virtual viewpoint, and so on.

The virtual camera setting unit 330 sets virtual camera parameters based on the user input via the GUI 320. Specifically, the virtual camera setting unit 330 receives a user input relating to the change (movement) of the position of the virtual camera, the chance (rotation) of the orientation, the change of the zoom magnification, and the like and sets them as parameters for generating a virtual viewpoint image. The virtual camera parameters set here are sent to the server 270. It may also be possible to design a configuration in which, for example, for a part or all of the parameters, default values in accordance with image capturing scenes are prepared in advance and parameters are set automatically The background 3D data editing unit 340 performs editing processing of the facility 3D data and the structure 3D data saved in the DB 250. The background 3D data editing unit 340 includes a difference detection unit 341 and an updating unit 342. The difference detection unit 341 detects a difference between the image obtained by performing test image capturing by each camera 112 and the simulation image in each cameral 112. Here, the simulation image is an image that simulates an image that would be captured from the position/orientation of the real camera 112 by using the background 3D data. It may also be possible for the server 270 to have the function of the difference detection unit 341. The updating unit 342 updates the background 3D data by changing the facility 3D data or adding new structure 3D data based on the difference detected by the difference detection unit 341 (or in accordance with a user input).

General Flow of Virtual Viewpoint Image Generation

Figure 7:
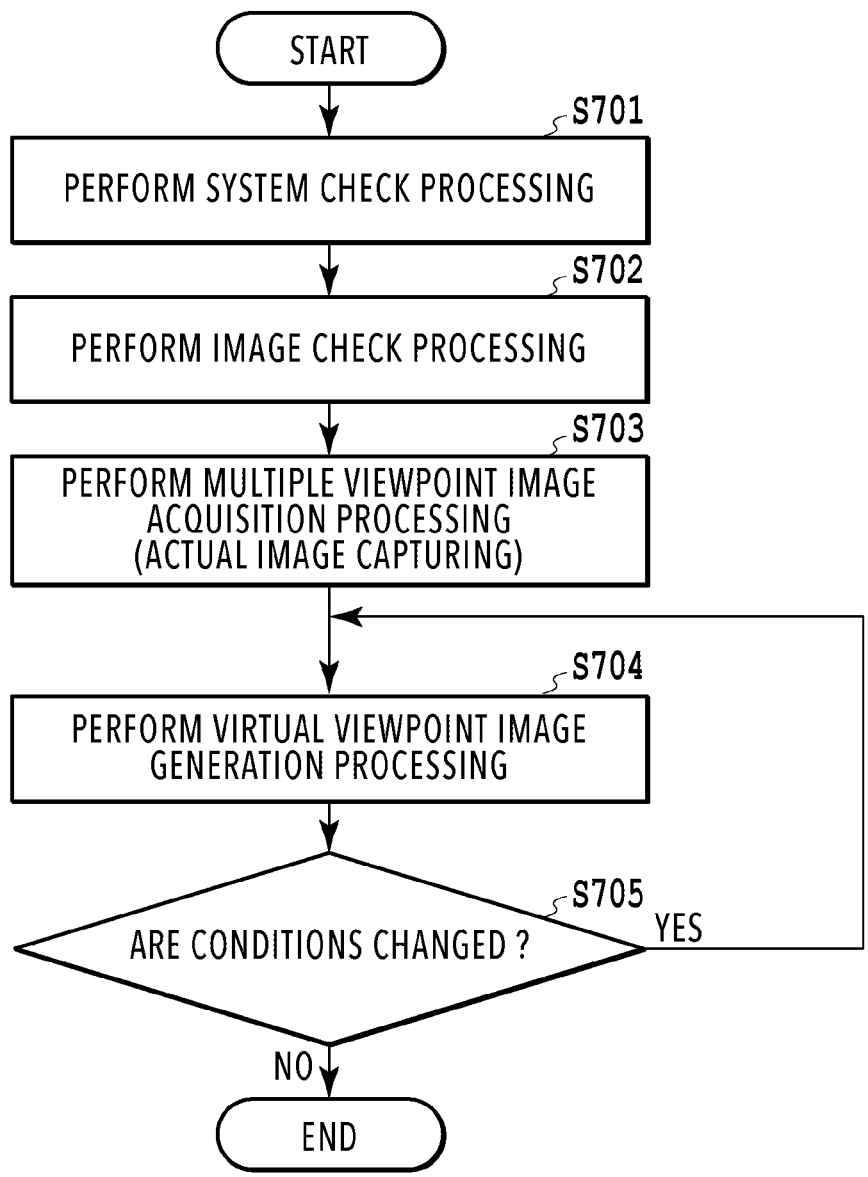
FIG. 7 is a flowchart showing a general flow until virtual viewpoint image generation.

Next, the general flow until a virtual viewpoint image is generated in the image processing system 100 is explained. FIG. 7 is a flowchart showing the general flow until a virtual viewpoint image is generated. Each piece of processing shown by the general flow in FIG. 7 is implemented by the control device 300 controlling the image capturing module 110, the server 270, and the DB 250. In the following explanation of the flow, symbol "S" indicates a step.

At S701, the control device 300 performs system check processing aiming at the check of whether each device within the image processing system 100 operates normally and necessary adjustment. Specifically, whether or not mechanical equipment and materials are sufficient is checked, parameters, such as the position, the orientation, and focal length, of the camera 112 are acquired/adjusted, synchronization/connection of the network path are checked, and so on. In the adjustment of the camera 111, matching of angle of view, color matching, adjustment to match each of the coordinates of the camera 112a to 112z with the world coordinates, and the like are included. In the matching of angle of view, adjustment of zoom, pan, tilt, and focus is performed in parallel. Then, in the color matching, adjustment of IRIS, ISO/gain, white balance, sharpness, and shutter speed is performed at the same time. The basic information (basic camera parameters) on the camera 112 including these adjustment results is sent to the control device 300 and saved in an internal storage, not shown schematically.

Next, at S702, the control device 300 performs image check processing aiming at the check in advance of what virtual viewpoint image is obtained in the state of the current system as preprocessing of the actual image capturing. In this image check processing, the above-described simulation image is generated by performing test image capturing under the same condition as that of the actual image capturing before the actual image capturing is started and the facility 3D data is changed/updated in accordance with the necessity. Details of the image check processing will be described later by referring to another flow.

Next, at S703, the control device 300 instructs the image capturing module 110 to perform image capturing (actual image capturing) of multiple viewpoint images, which are a source of a virtual viewpoint image, at the same time of the start of a game or the like. Upon receipt of the instructions, each image capturing module 110 performs actual image capturing and the data of the images (multiple viewpoint images) captured by each camera 112 is transmitted from the camera adaptor 120 to the server 270.

Next, at S704, the control device 300 sends instructions to generate a virtual viewpoint image to the server 270 along with the virtual camera parameters set based on a user input. Upon receipt of the instructions, the server 270 generates a virtual viewpoint image in accordance with the virtual camera parameters by using the facility 3D data and the structure 3D data held in the DB 250.

At S705, the control device 300 instructs the server 270 to generate a virtual viewpoint image (to return to S704) under new conditions after the change in a case where there is a user input to the effect that generation of a virtual viewpoint image under different conditions (with virtual camera parameters with different contents) is continued. In a case where there are no instructions to continue generation, this flow is terminated.

The above is the general flow of generation of a virtual viewpoint image in the image processing system 100. In the flow in FIG. 7, the contents are such that a virtual viewpoint image is generated after the actual image capturing is completed, but in a case of generating a virtual viewpoint image of a moving image by performing actual image capturing in the moving image mode, it may also be possible to generate a virtual viewpoint image in parallel while performing actual image capturing by sequentially performing processing in order from the acquired image (frame).

Image Check Processing

Figure 8:
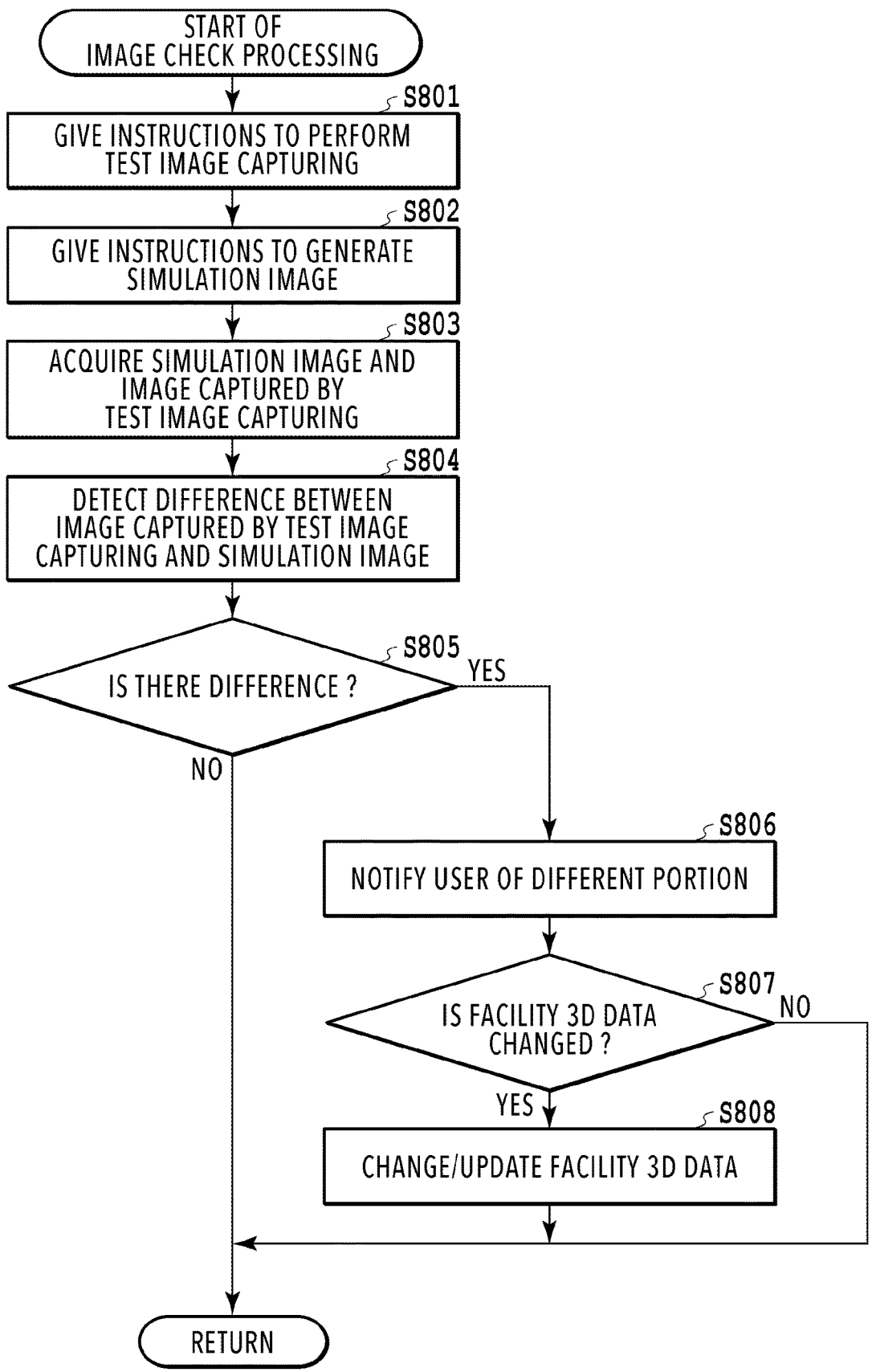
FIG. 8 is a flowchart showing details of image check processing.

Next, details of the image check processing, which is the feature of the present embodiment, are explained by using the flowchart in FIG. 8. The series of processing shown below is implemented by the CPU within the control unit 310 loading a predetermined program stored in the ROM onto the RAM and executing the program.

At S801, the control unit 310 instructs each image capturing module 110 to perform test image capturing for image check processing. Upon receipt of the instructions to perform test image capturing, each image capturing module 110 captures each image of the same time by controlling synchronization of the internal cameras 112. The data of the captured images (images captured by test image capturing) is held within the camera adaptor 120.

At S802 that follows, the control unit 310 sequentially gives instructions necessary for generation of a simulation image for each image capturing module 110 and the server 270. Specifically, first, each image capturing module 110 is given instructions to perform foreground/background separation for the image captured by test image capturing as a target and to perform generation of foreground three-dimensional model source information using the foreground image obtained by the foreground/background separation. The data of the foreground image, the background image, and the foreground three-dimensional model source information obtained by each camera adaptor 120 is transmitted to the server 270. Then, the control device 300 instructs the server 270 to generate a simulation image. Upon receipt of the instructions, the server 270 generates a simulation image by using the data of the foreground image, the background image, and the foreground three-dimensional model source information generated in each camera adaptor 120. In the generation of a simulation image, first, a combined background image is generated by using the received background images. Then, the generated combined background image is pasted to the facility 3D data read from the DB 250 as a texture and a texture-attached background three-dimensional model is generated. Further, by using the received data of the foreground three-dimensional model source information and the foreground image, a texture-attached foreground three-dimensional model is generated. Then, by using the texture-attached foreground three-dimensional model and the texture-attached background three-dimensional model, a simulation image in accordance with the virtual camera parameters is generated. The virtual camera parameters used at this time are the basic camera parameters described previously indicating the position, the orientation, the focal length, and the like of each camera 112. That is, the basic camera parameters of each camera 112 obtained by the system check processing at S701 are used as the virtual camera parameters here. Due to this, it is possible to obtain a virtual viewpoint image (=simulation image) in a case where the actual viewpoint and the actual angle of view in a real camera are taken to be a virtual viewpoint and a virtual angle of view.

Figure 9:
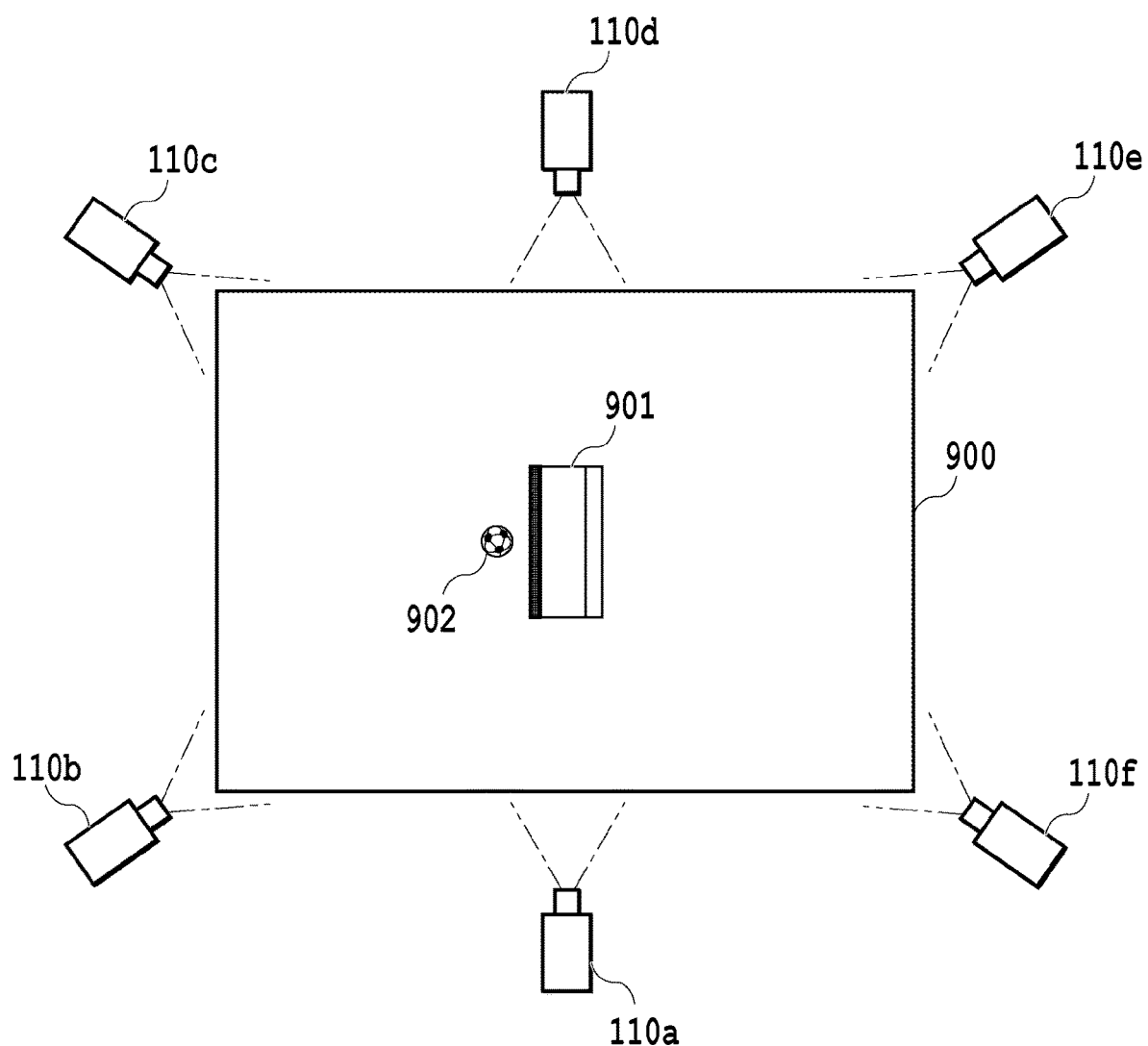
FIG. 9 is a diagram showing camera arrangement in a case where a around is viewed from a bird's eye.
Figure 10A:
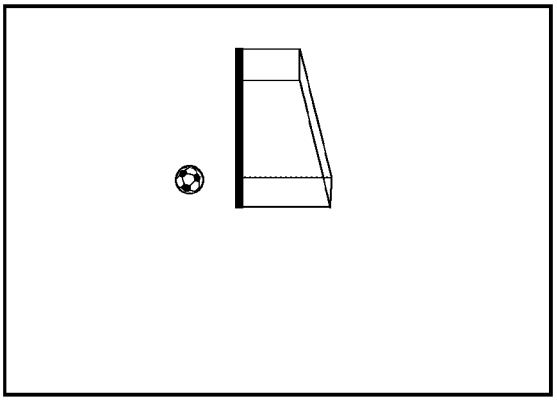
FIG. 10A to FIG. 10F are each a diagram showing an image captured by test image capturing of each image capturing module.
Figure 10D:
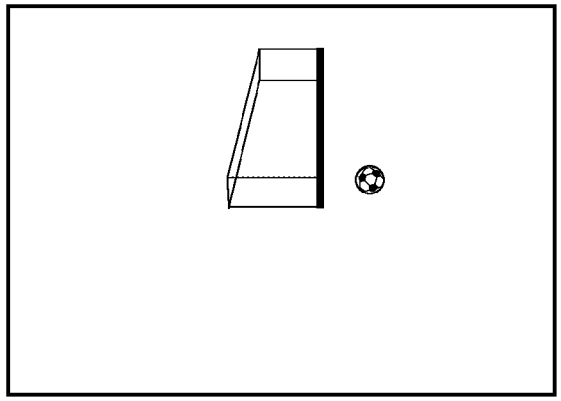
Figure 10B:
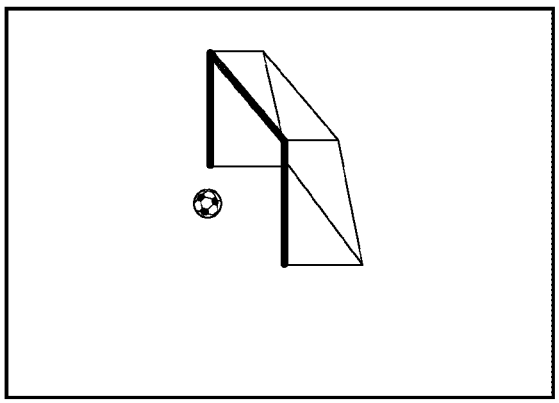
Figure 10E:
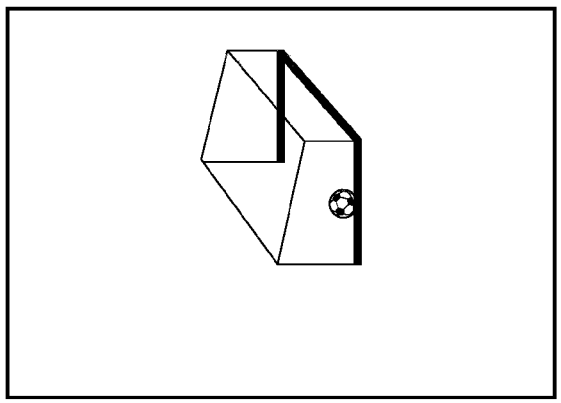
Figure 10C:
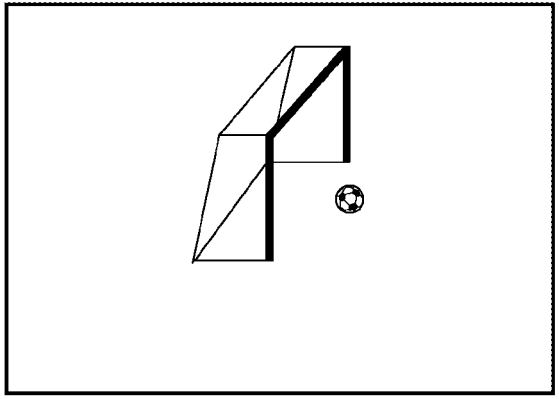
Figure 10F:
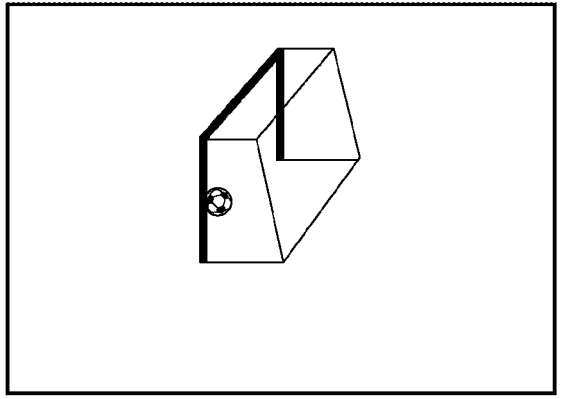
Figure 11A:
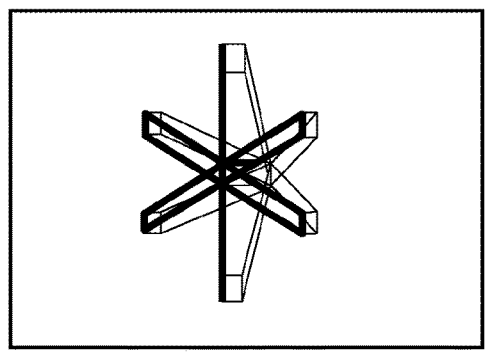
FIG. 11A is a diagram showing an example of a combined background image and FIG. 11B to FIG. 11G are each a diagram showing an example of a simulation image.
Figure 11B:
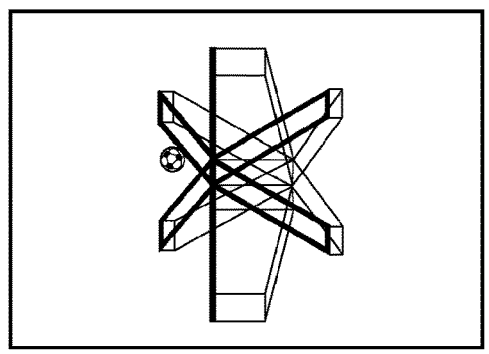
Figure 11E:
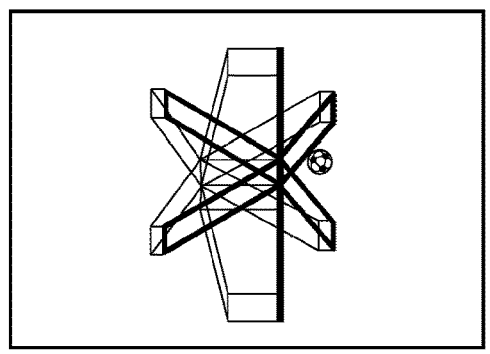
Figure 11C:
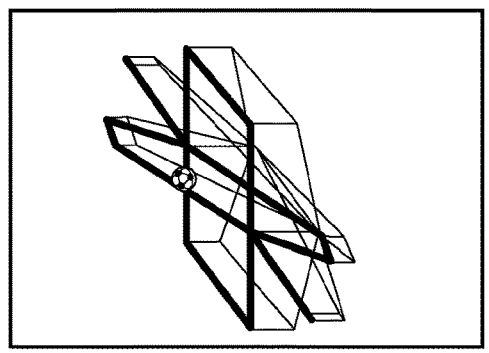
Figure 11F:
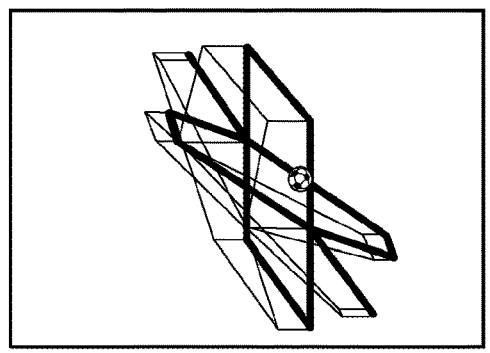
Figure 11D:
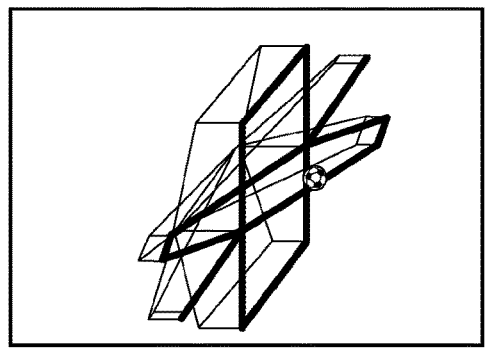
Figure 11G:
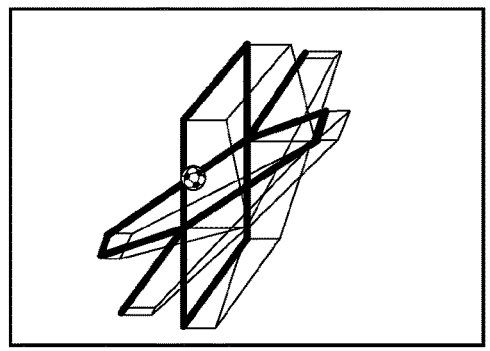

Here, the simulation image that is generated at this step is explained by using a specific example. FIG. 9 is a diagram showing camera arrangement in a case where the ground within a stadium is viewed from a bird's eye. For simplification of explanation, the number of image capturing modules is simplified to six, that is, the image capturing modules 110a to 110f. In FIG. 9, at the center of a ground 900, a soccer goal 901 exists and a ball 902 exists in front of the soccer goal 901. Here, for convenience of explanation, it is assumed that the stadium as a facility does not exist and the facility 3D data is data representing only the ground plane. It is assumed that the cameras 112 within the image capturing modules 110a to 110f are installed at the positions at a predetermined height from the ground 900 and the orientation thereof is held so as to face the soccer goal 901 located at the center of the ground 900. FIG. 10A to FIG. 10F are images captured by test image capturing acquired by the image capturing modules 110a to 110f FIG. 10A shows the image captured by test image capturing corresponding to the image capturing module 110a. Similarly, FIG. 10B corresponds to the image capturing module 110b, FIG. 10C corresponds to the image capturing module 110c, FIG. 10D corresponds to the image capturing module 110d, FIG. 10E corresponds to the image capturing module 110e, and FIG. 10F corresponds to the image capturing module 110f, In a case where the image captured by test image capturing such as this is acquired by each camera 112, for each image captured by test image capturing, processing to separate the image into foreground images and background images is performed by the foreground/background separation unit 140 of each camera adaptor 120. Here, it is assumed that the specific object that is extracted as a foreground is the ball 902. That is, it is assumed that the image area of the ball 902 of the image captured by test image capturing is extracted as a foreground image and the other image areas including the soccer goal 901 are extracted as a background image. In the background image thus obtained, the soccer goal 901 exists but the portion of the ball 902 is blank (empty). On the other hand, the foreground image is an image in which only the portion of the ball 902 is cut out. For the ball 902, which is the foreground, a texture-attached foreground three-dimensional model representing the ball 902 three-dimensionally is created from the foreground three-dimensional model source information and the foreground image obtained by each of the image capturing modules 110a to 110f. For the background including the soccer goal 901, one combined background image combining the background images obtained by each of the image capturing modules 110a to 110f is generated first. FIG. 11A shows a combined background image combining each background image including the soccer goal 901 into one image. It is known that the image of the portion of the soccer goal 901 existing within each image captured by test image capturing of FIG. 10A to FIG. 10F is projected onto the ground 900 from the viewpoint position of each camera 112 and pasted thereto. That is, the image areas representing the shape of the soccer goal 901 as the background captured by the six cameras 112 appear radially on the combined background image in accordance with the number of cameras 112. Then, the combined background image including the soccer goal 901 thus projected radially is pasted as a background texture to the ground plane as the facility 3D data.

By using the texture-attached background three-dimensional model and the texture-attached foreground three-dimensional model obtained as described above, an image representing a view from the position/orientation indicated by the basic camera parameters of each camera 112 is generated by rendering. The rendering image thus obtained is the simulation images shown in FIG. 11B to FIG. 11G The correspondence relationship between each of the image capturing modules 110a to 110f and each simulation image in FIG. 11B to FIG. 11G is the same as in the case with the images captured by test image capturing in FIG. 10A to FIG. 10F. That is, each of the image capturing modules 110a to 110f and each of FIG. 11B to FIG. 11G correspond to each other in a one-to-one manner.

At S803, the control device 300 acquires the data of the simulation image and the image captured by test image capturing described above from the server 270. It may also be possible to acquire the data of the image captured by test image capturing directly from each camera adaptor 120. Then, at S804, the control device 300 detects a difference between each image captured by test image capturing and the simulation image, which are in the correspondence relationship. The difference that is detected here results from that the environment at the time of test image capturing is different from the environment at the time of creation of the facility 3D data, such as that an object whose three-dimensional shape is not represented in the facility 3D data is included in the background of each image captured by test image capturing. The detection of a difference is implemented by the difference detection unit 341 comparing corresponding pixels, or blocks configured by a plurality of corresponding pixels in the image captured by test image capturing and the simulation image, and specifying a portion where a luminance difference or a chromaticity difference between both images larger than or equal to a predetermined value exists. For example, for the image capturing module 110a, the radial portion onto which the image area representing the soccer goal 901 viewed from another camera viewpoint is projected is detected as a different portion. Similarly, for the other image capturing modules 110b to 110f, detection of a different portion is performed between the image captured by test image capturing and the simulation image in the correspondence relationship. Here, a difference is detected by performing a comparison between the image captured by test image capturing and the simulation image, but what is required is that it is possible to check whether or not the facility 3D data prepared in advance is good, and therefore, it may also be possible to detect a difference by comparing images from which the foreground portion is removed.

Then, at S805, the control unit 310 determines the next processing in accordance with the results of the difference detection processing at S804. In a case where a significant difference is detected, the processing advances to S806 and in a case where a significant difference is not detected, this processing is terminated.

At S806, the control unit 310 notifies a user of the different portion detected at S804 by the GUI 320. Specifically, the control unit 310 displays the image captured by test image capturing and the simulation image in the correspondence relationship in an aspect in which it is possible for a user to recognize the different portion, for example, by arranging them side by side. At this time, it is desirable to highlight the detected different portion by a method of, for example, displaying the different portion as a shaded area, displaying the contour thereof by a thick line, or displaying only the different portion by another color. By highlighting the portion where there is a difference between both images, it is made easier for a user to grasp the different portion. Further, it may also be possible to display related information together by, for example, displaying the positions of the cameras 112 corresponding to both images being displayed, and so on. With the notified contents in mind, a user determines whether or not it is necessary to change the facility 3D data.

At S807, the control unit 310 determines the next processing in accordance with a user operation. In a case where an input operation to the effect that the facility 3D data is changed is received from a user, the processing advances to S808. On the other hand, in a case where an input operation to the effect that the image check processing is terminated is received, this processing is terminated.

Figure 12:
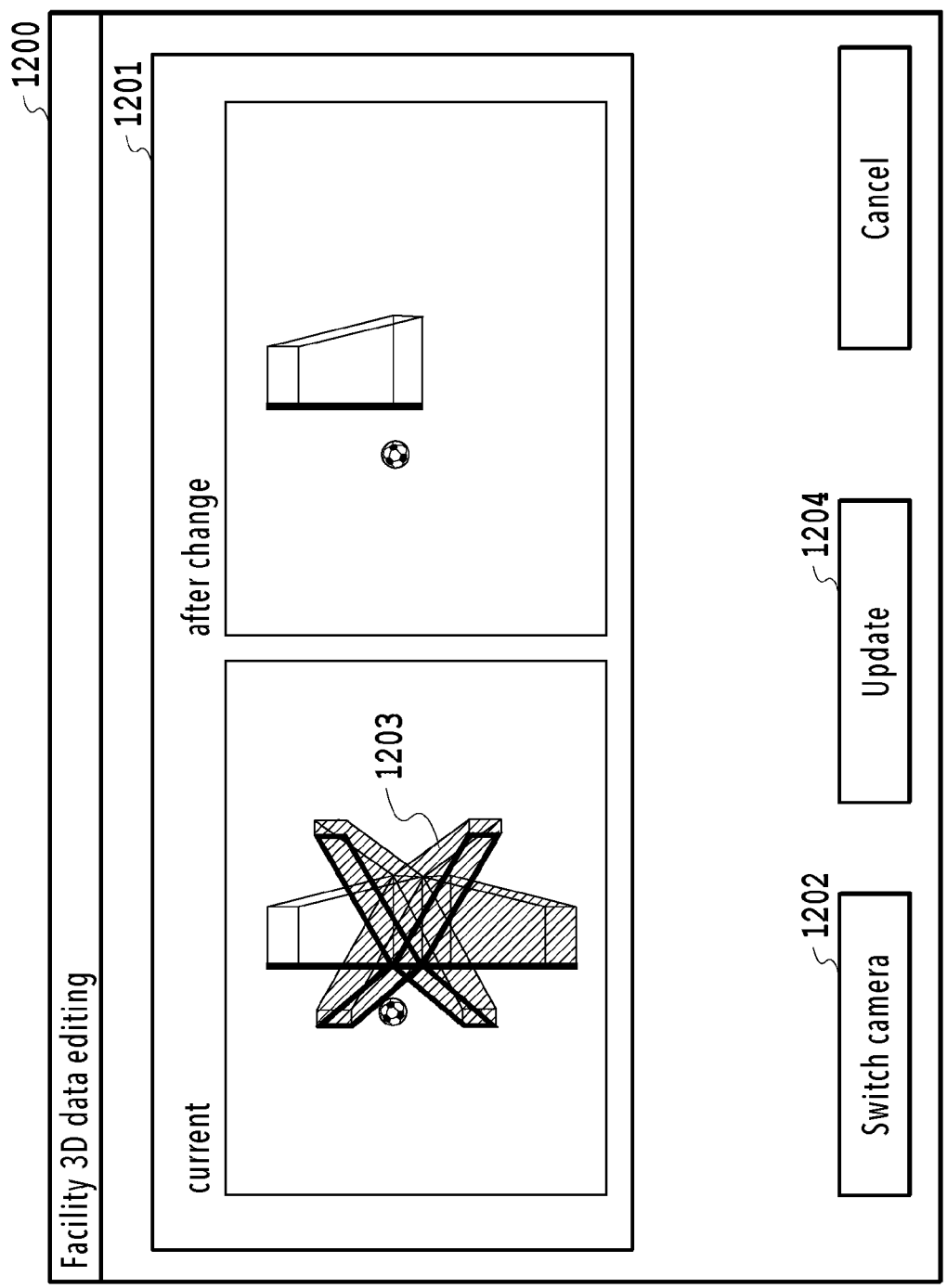
FIG. 12 is a diagram showing an example of an editing UI screen of facility 3D data.

At S808, the control unit 310 performs processing to change/update the background 3D data by the background 3D data editing unit 340 so that the object image area extending radially on the simulation image disappears. Specifically, first, an editing UI screen for the processing to change/update the background 3D data is displayed on the GUI 320. FIG. 12 is an example of the editing UI screen. On the left side within an image display area 1201 within an editing UI screen 1200, the simulation image created by using the current facility 3D data is displayed. Then, on the right side within the image display area 1201, the simulation image created by using the facility 3D data having been changed so that the above-described detected difference is eliminated is displayed. It is possible for a user to switch the camera viewpoint of the display-target simulation image by pressing down a "Switch camera" button 1202. Prior to the display of comparison, the control unit 310 first acquires the data of the facility 3D data used for the generation of the simulation image by accessing the DB 250. Then, in the background 3D data editing unit 340, a necessary change is performed for the acquired facility 3D data. At the time of this change, for example, the object (here, "soccer goal") at the portion where a difference occurs because the radial image area as described previously appears is first specified by the matching processing using the image captured by test image capturing. For this matching processing, of a plurality of pieces of 2D data held in association with the structure 3D data, the 2D data in a case where the object is viewed from an angle the closest to the camera viewpoint is made use of. Then, the structure 3D data indicating the shape of the specified object is acquired from the DB 250 and the structure 3D data is incorporated in the current facility 3D data and this is taken to be new facility 3D data. In a case where there is no structure 3D data corresponding to the object at the different portion within the 3D data library, it may also be possible to create 3D data of the object corresponding to the different portion from the images captured by test image capturing obtained by each camera and to incorporate the 3D data in the current facility 3D data. Further, it may also be possible to display the facility 3D data acquired from the DB 250 on the editing UI screen and to enable a user to directly add a three-dimensional shape of the object corresponding to the different portion by using a touch pen, a mouse, or the like, or to enable a user to finely modify the contents after the automatic change. The change as described above is a method of dealing with a difference that occurs because a structure or the like that did not exist in the stage of creating the facility 3D data exists in an environment in which test image capturing is performed. On the contrary, for a difference that occurs because an object that existed in the stage of creating the facility 3D data does not exist in an environment in which test image capturing is performed, it is sufficient to perform a change to delete the portion representing the three-dimensional shape of the object from the facility 3D data. Then, the control unit 310 transmits the data of the facility 3D data after the change to the server 270 and at the same time, gives instructions again to generate a simulation image using this. Then, the control unit 310 acquires a new simulation image that is generated from the server 270 and displays the new simulation image in the image display area 1201 side by side with the simulation image before the change. At the time of performing the display, it may also be possible to indicate the image area corresponding to the different portion detected at S804 by, for example, slashes 1203 or the like as in FIG. 12. Alternatively, in place of slashes, it may also be possible to highlight the different portion by another method of, for example, indicating the contour of the different portion by a thick line, displaying only the different portion by another color, and so on. By highlighting the image area corresponding to the different portion as described above, it is made easier for a user to grasp the different portion. In FIG. 12, the simulation images before and after the facility 3D data is changed are arranged side by side, that is, arranged horizontally, but may be arranged one on top of the other, that is, arranged vertically, or to display both images in an overlapping manner. Further, in the example in FIG. 12, one set is displayed each time in units of image capturing modules, but it may also be possible to display a plurality of sets at the same time.

Then, in a case where a user, who has determined that there is no problem with the simulation image after the change, presses down an "Update" button 1204, the facility 3D data after the change is transmitted to the DB 250 and the facility 3D data within the background 3D data library is updated to the contents after the change. As a result of this, at the generation step (S704) of a virtual viewpoint image after the actual image capturing, the facility 3D data after the change is used. In this example, a virtual viewpoint image is generated by using the facility 3D data in which the three-dimensional shape of the soccer goal 901 located at the center of the ground 900 is represented appropriately.

The above is the contents of the image check processing. By checking in advance the virtual viewpoint image actually generated/distributed by a simulation and changing the facility 3D data as needed as described above, generation of a high-quality virtual viewpoint image is guaranteed.

Modification Example

In the example described above, the background 3D data is changed/updated by performing the image check processing before performing the actual image capturing, but it may also be possible to perform the similar processing while the actual image capturing is being performed. By doing so, even in a case where, for example, some structure is installed and so on after an event starts, it is possible to change/update the background 3D data to more appropriate contents, and therefore, it is possible to obtain a higher-quality virtual viewpoint image.

Further, in the present embodiment, a user is caused to determine whether or not it is necessary to change/update the facility 3D data, but it may also be possible to automatically change/update the facility 3D data without a user input. At this time, it is no longer necessary to notify a user of the different portion (S806). Further, it may also be possible to display the image captured by test image capturing and the simulation image from the same camera viewpoint on the GUI 320 and to enable a user to directly change the facility 3D data to arbitrary contents after the user directly checks the different portion, in place of performing the automatic detection of the different portion (S804).

Further, in place of changing the facility 3D data, it may also be possible to register the 3D data of the object corresponding to the different portion anew to the background 3D data library as 3D data of an independent structure or the like.

Further, in the present embodiment, explanation is given by taking the image captured by test image capturing as a still image, but it may also be possible to take a moving image as a target. At this time, in a case where image capturing is performed for two seconds at an image capturing rate of 60 fps, images captured by test image capturing corresponding 120 frames from different viewpoints are obtained, and therefore, it is sufficient to perform the processing at each step in units of frames.

As above, according to the present embodiment, in a case where a virtual viewpoint image is generated by taking an event in a large-scale venue, such as a stadium, as a target, it is possible to obtain a high-accuracy background three-dimensional model at a light load in a short time.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is made possible to generate a high-quality virtual viewpoint image while suppressing the processing load relating to generation of a virtual viewpoint image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-084947, filed Apr. 26, 2018 which is hereby incorporated by reference wherein in its entirety.

What is claimed is:

1. A system comprising:
one or more memories storing instructions; and
one or more processors executing the instructions to:
obtain three-dimensional shape data representing a three-dimensional shape of an object in an imaging region;
generate, based on the obtained three-dimensional shape data, a simulation image corresponding to a viewpoint from at least one image capturing apparatus included in a plurality of image capturing apparatuses capturing the imaging region;
detect a difference between the generated simulation image and a captured image that is captured by the at least one image capturing apparatus; and
change the obtained three-dimensional shape data of the object based on the detected difference.

2. The system according to claim 1, wherein
the object is a background,
a combined background image is generated by combining a plurality of background images extracted from a plurality of captured images captured by the plurality of image capturing apparatuses, and
the simulation image is generated based on the generated combined background image and the obtained three-dimensional shape data of the background.

3. The system according to claim 1, wherein an image area representing an object shape that radiates out in the simulation image is detected as the difference.

4. The system according to claim 1, wherein
the difference is detected by comparing corresponding pixels or blocks configured by a plurality of corresponding pixels in the simulation image and the captured image.

5. The system according to claim 1, wherein the obtained three-dimensional shape data is changed so that the detected difference between the simulation image and the captured image is reduced.

6. The system according to claim 1, wherein
an object which is not included in the generated simulation image and which is included in the captured image is detected as the difference.

7. The system according to claim 1, wherein
an object which is included in the generated simulation image and which is not included in the captured image is detected as the difference.

8. The system according to claim 1, further comprising:
a user interface receiving user instructions, wherein
the simulation image is displayed in the user interface and the obtained three-dimensional shape data is changed in accordance with user instructions via the user interface.

9. The system according to claim 8, wherein
the detected difference is highlighted in the displayed simulation image.

10. The system according to claim 1, wherein
the obtained three-dimensional shape data is changed while image capturing using the plurality of image capturing apparatuses is being performed.

11. The system according to claim 1, wherein
the simulation image is generated by using parameters of the at least one image capturing apparatus.

12. The system according to claim 11, wherein
the parameters of the at least one image capturing apparatus include information on a position, a direction, and a focal length of the at least one image capturing apparatus.

13. A method comprising:
obtaining three-dimensional shape data representing a three-dimensional shape of an object in an imaging region;
generating, based on the obtained three-dimensional shape data, a simulation image corresponding to a viewpoint from at least one image capturing apparatus included in a plurality of image capturing apparatuses capturing the imaging region;
detecting a difference between the generated simulation image and a captured image that is captured by the at least one image capturing apparatus; and
changing the obtained three-dimensional shape data of the object based on the detected difference.

14. A non-transitory computer readable storage medium storing a program for causing a computer to perform a method, the method comprising:
obtaining three-dimensional shape data representing a three-dimensional shape of an object in an imaging region;
generating, based on the obtained three-dimensional shape data, a simulation image corresponding to a viewpoint from at least one image capturing apparatus included in a plurality of image capturing apparatuses capturing the imaging region;
detecting a difference between the generated simulation image and a captured image that is captured by the at least one image capturing apparatus; and
changing the obtained three-dimensional shape data of the object based on the detected difference.

15. The system according to claim 4, wherein a portion where there is a chromaticity difference or a luminance difference larger than or equal to a value between the simulation image and the captured image is detected as the difference.

16. The system according to claim 6, wherein three-dimensional shape data representing a three-dimensional shape of the detected object is added to the obtained three-dimensional shape data.

17. The system according to claim 7, wherein the three-dimensional shape representing a three-dimensional shape of the detected object is removed from the obtained three-dimensional shape data of the object.

18. The system according to claim 1, wherein
the captured image is an image captured by the at least one image capturing apparatus at a first timing, and
the obtained three-dimensional shape data is generated before the first timing.

19. The system according to claim 18, wherein the one or more processors further execute the instructions to:

obtain captured images captured by the plurality of image capturing apparatuses which capture the imaging region at another timing after the first timing;

generate a virtual image corresponding to a virtual viewpoint based on the changed three-dimensional shape data of the object and the obtained captured images which are captured by the plurality of image capturing apparatuses at the another timing.

20. The system according to claim 1, wherein the object comprises a still object.

21. The system according to claim 1, wherein the object comprises an object installed within the imaging region.

* * * * *